(12) United States Patent
Yoshida

(10) Patent No.: US 7,962,286 B2
(45) Date of Patent: Jun. 14, 2011

(54) VEHICLE-MOUNTED NAVIGATION APPARATUS

(75) Inventor: Nobuo Yoshida, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 211 days.

(21) Appl. No.: 12/514,266

(22) PCT Filed: Jul. 26, 2007

(86) PCT No.: PCT/JP2007/064686
§ 371 (c)(1),
(2), (4) Date: May 8, 2009

(87) PCT Pub. No.: WO2008/056470
PCT Pub. Date: May 15, 2008

(65) Prior Publication Data
US 2009/0306890 A1     Dec. 10, 2009

(30) Foreign Application Priority Data

Nov. 9, 2006   (JP) .................................. 2006-304211

(51) Int. Cl.
G01S 19/47    (2010.01)
G01C 21/00    (2006.01)
G08G 1/123    (2006.01)

(52) U.S. Cl. ..... 701/220; 701/208; 701/200; 342/357.3; 342/357.28; 34/995.28

(58) Field of Classification Search ................. 701/200, 701/214, 213, 210, 208, 207, 221, 220, 300; 342/357.23, 357.31, 357.32; 340/995.25, 340/995.28, 995.14, 995.1
See application file for complete search history.

(56) References Cited

FOREIGN PATENT DOCUMENTS

| DE | 3828745 A1 | 8/1988 |
|---|---|---|
| DE | 19743371 A1 | 4/1989 |
| JP | 6-213670 A | 8/1994 |
| JP | 9-304101 A | 11/1997 |
| JP | 10-068627 A | 3/1998 |
| JP | 2000-028383 A | 1/2000 |
| JP | 2002-071366 A | 3/2002 |
| JP | 2002-257555 A | 9/2002 |
| JP | 2003-207341 A | 7/2003 |
| JP | 2003-346204 A | 12/2003 |
| JP | 2004-251745 A | 9/2004 |
| JP | 2005-009991 A | 1/2005 |
| JP | 2006-019784 A | 1/2006 |

*Primary Examiner* — Thomas G Black
*Assistant Examiner* — Christine Behncke
(74) *Attorney, Agent, or Firm* — Birch, Stewart, Kolasch & Birch, LLP

(57) ABSTRACT

When a CPU 11 controls a drawing control and storage unit 14 according to an operation performed on an operation unit 3 not to perform any navigation display on a monitoring unit 2, the CPU controls a switch SW1 to an off state during a time period during which the CPU does not perform this navigation display, and stops the supply of electric power to a secondary storage unit 13 to stop the operation of this secondary storage unit 13, thereby reducing the consumption of the secondary storage unit.

3 Claims, 5 Drawing Sheets

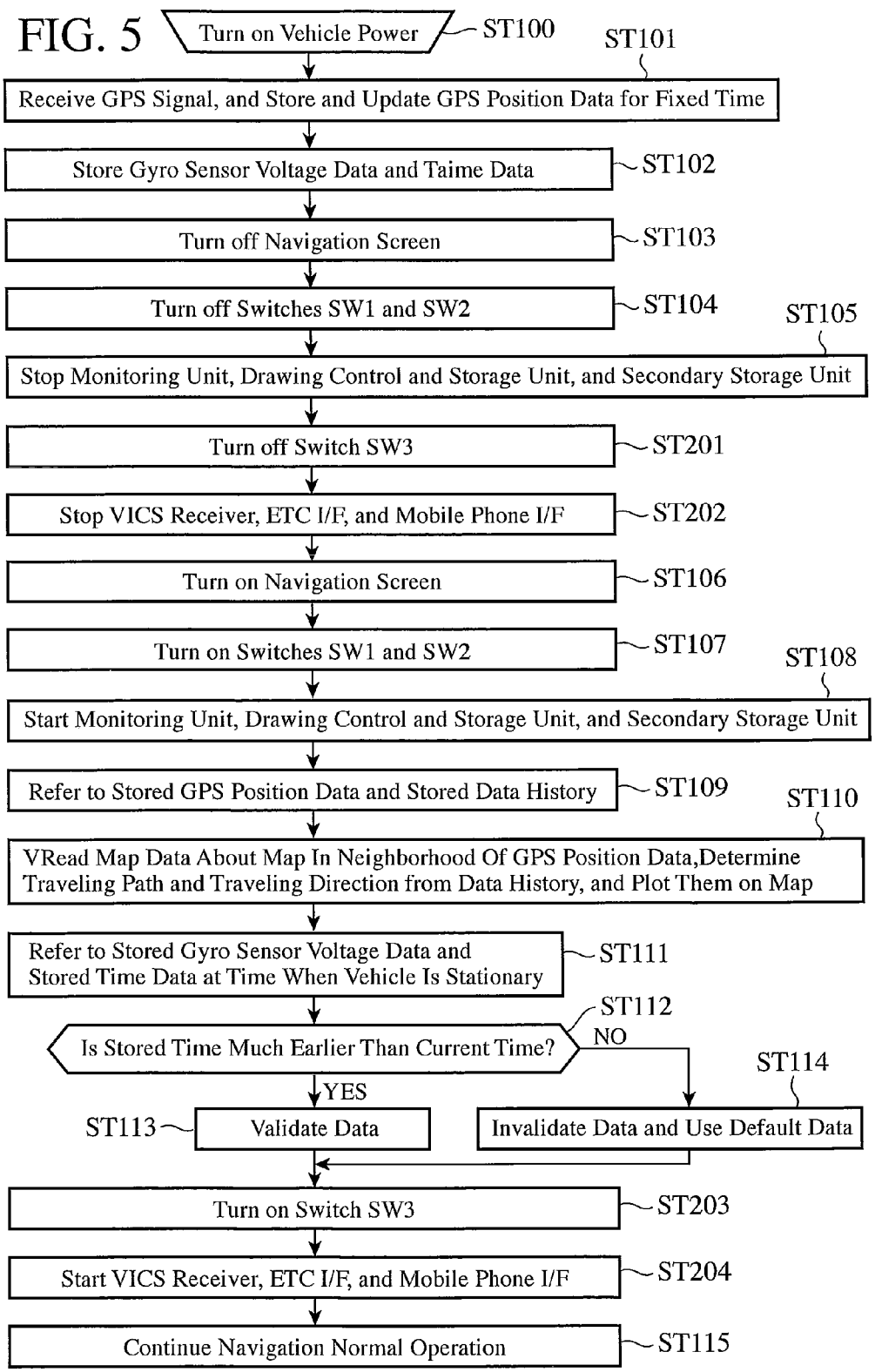

VEHICLE-MOUNTED NAVIGATION APPARATUS

FIELD OF THE INVENTION

The present invention relates to a vehicle-mounted navigation apparatus which reduces the operating times of relatively short-life portions thereof, and which achieves power savings.

BACKGROUND OF THE INVENTION

Currently-used vehicle-mounted navigation apparatuses make each circuit thereof except circuits for producing a screen display operate continuously in order to enable a navigation display in an instant when starting a navigation function the next time also in an operation mode, such as in a screen display off state or in an audio operation state in an AV mode, other than a navigation mode. Therefore, even while being placed in the screen display off state or using the operation mode other than the navigation mode, i.e., while not using the navigation function, the consumption of each unit is progressing.

It can be guessed that a user who often drives his or her vehicle to travel along the same route in daily life often turns off the screen display or places the navigation apparatus in another operation mode other than the navigation mode when driving the vehicle along a road on the route which he or she fully grasps, the road state and so on being also grasped by the user, because the user does not need any navigation. In such an operating condition, a large gap may occur between the usage time of the navigation function which the user recognizes, and the life of the vehicle-mounted navigation apparatus.

There has been also provided a vehicle-mounted navigation apparatus in which the supply of power to a display device of the navigation apparatus is turned off when a user manipulates an electric power switch, and a CPU controls the supply of the electrical power to an external storage unit which stores map data. The above-mentioned CPU reads map data about an area whose center is at the current position of the vehicle from the external storage unit in turn to capture them into a RAM, and stops the supply of the electrical power to the external storage unit after capturing the map data. The vehicle-mounted navigation apparatus reduces the power consumption of the whole thereof by turning on the power supply of the external storage only at the time of performing the operation of reading map data and turning off the power supply except at that time. During travel of the vehicle, a vehicle-mounted navigation apparatus always performs the supply of electrical power to a system controller comprised of a CPU, a RAM, and soon in order to always estimate the current position of the vehicle (for example, refer to patent reference 1).

[Patent reference 1] JP,10-68627,A (see pages 2 to 3 and FIGS. 1 and 2)

Because conventional vehicle-mounted navigation apparatuses are constructed as mentioned above, they read map data as needed during travel of the vehicle in order to recognize the current position of the vehicle regardless of whether the conventional vehicle-mounted navigation apparatuses are performing a navigation display. A problem is therefore that the consumption of a storage unit used by the navigation function, like a DVD driver, an HDD, or the like, progresses, and the user feels that the life of the vehicle-mounted navigation apparatus is shorter against the use frequency of the navigation apparatus which the user has recognized.

A further problem is that the control operation of turning on the power supply of an external storage unit at the time of reading map data from the external storage unit simply causes frequent repetitions of the on/off switching of the power supply of the external storage unit because the system controller always performs a process of using map data if the vehicle is traveling, and it is therefore difficult to improve the life of the vehicle-mounted navigation apparatus.

The present invention is made in order to solve the above-mentioned problems, and it is therefore an object of the present invention to provide a vehicle-mounted navigation apparatus which, in a screen display off state or when performing an operation based on a function other than navigation, reduces the consumption of a storage unit, such as a relatively short-life DVD driver and a relatively short-life HDD, to increase the longevity of the actual use thereof, and which returns to a navigation display promptly.

DISCLOSURE OF THE INVENTION

In a vehicle-mounted navigation apparatus in accordance with the present invention, when a control means controls a display means according to an operation performed on an operation means not to perform any navigation display, the control means performs a control operation of stopping the operation of a secondary memory means, and also causing a main memory means to store GPS position data collected over a certain time period during a time period during which the control means does not perform any navigation display, and, when performing a navigation display next time according to an operation performed on the operation means, the control means performs a control operation of determining a traveling path and a traveling direction of the vehicle from the GPS position data stored in the main memory means and generating image data for the navigation display.

Because the vehicle-mounted navigation apparatus in accordance with the present invention stops the operation of the secondary memory means, and also causes the main memory means to store GPS position data during a time period during which the control means does not perform any navigation display, and, when performing a navigation display next time, generates image data for the navigation display on the basis of the stored GPS position data, there is provided an advantage of being able to increase the longevity of the whole vehicle-mounted navigation apparatus, and also return to a navigation display promptly.

BRIEF DESCRIPTION OF THE FIGURES

FIG. 5 is a flow chart showing the operation of the vehicle-mounted navigation apparatus in accordance with Embodiment 2.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
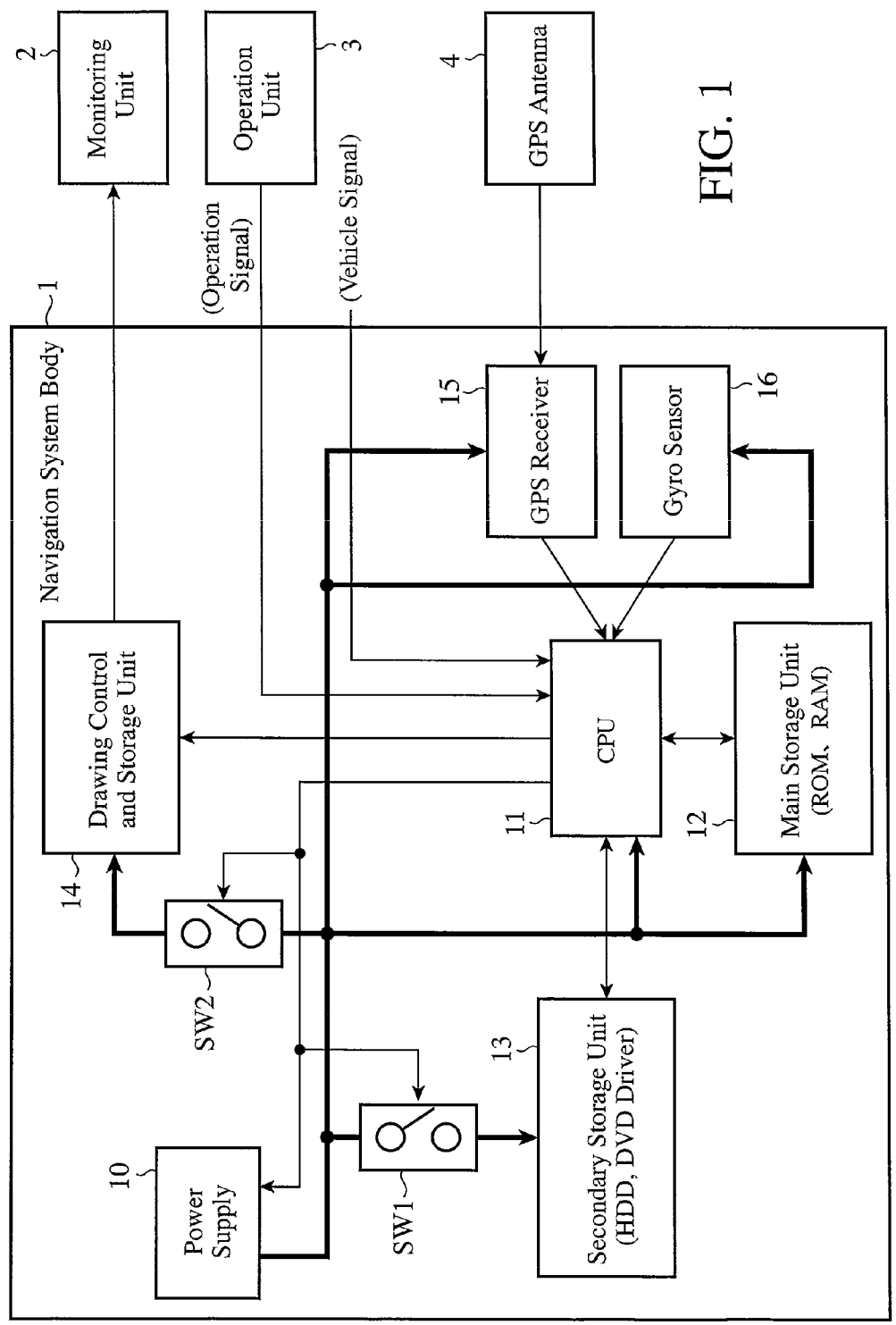
FIG. 1 is a block diagram showing the structure of a vehicle-mounted navigation apparatus in accordance with Embodiment 1 of the present invention.

FIG. 1 is a block diagram showing the structure of a vehicle-mounted navigation apparatus in accordance with Embodiment 1 of the present invention. Hereafter, the structure of portions which are features of the present invention and related portions will be explained, and the illustration and explanation of each component which is used when the vehicle-mounted navigation apparatus performs an operation other than a navigation function will be omitted. The vehicle-mounted navigation apparatus shown in FIG. 1 is comprised of a navigation system body 1 which is constructed as will be mentioned below, a monitoring unit 2 which produces a screen display and which consists of, for example, a liquid crystal display, an operation unit 3 which is comprised of equipment, e.g. a remote control unit, with which the user makes settings to control the operation of the vehicle-mounted navigation apparatus, operation buttons disposed in the monitoring unit 2, and so on, and a GPS antenna 4 for receiving electric waves from Global Positioning System (referred to as GPS from here on) satellites.

The navigation system body 1 is provided with a power supply 10 which activates the navigation system body 1, a CPU 11 which is a control means for performing control of the operation of the navigation system body 1, a main storage unit 12 which is comprised of memory devices, such as a ROM and a RAM, a secondary storage unit 13 which is comprised of storage units, such as an HDD and a DVD driver, a drawing control and storage unit 14 for processing image data generated by the CPU 11 under the control of the CPU 11 in such a way that an image is displayed on the monitoring unit 2, a GPS receiver 15 for processing a GPS signal inputted from the GPS antenna 4 to output GPS position data to the CPU 11, and a gyro sensor 16 for detecting the traveling direction of a vehicle. The navigation system body is connected and constructed in such a way that the output operation of the power supply 10 is controlled by the CPU 11.

The navigation system body 1 is provided with a switch SW1 for switching on and off a connection between the secondary storage unit 13 and the power supply 10 under the control of the CPU 11, and a switch SW2 for switching on and off a connection between the drawing control and storage unit 14 and the power supply 10 under the control of the CPU 11.

The power supply 10 is connected and constructed in such a way as to supply power to the secondary storage unit 13 and the drawing control and storage unit 14 via the switches SW1 and SW2, as mentioned above, and to also supply power to the CPU 11, the main storage unit 12, the GPS receiver 15, the gyro sensor 16, etc.

The CPU 11 is connected and constructed in such a way as to output and input each control signal, data, or the like to and from the main storage unit 12, the secondary storage unit 13, the drawing control and storage unit 14, the GPS receiver 15, and the gyro sensor 16. The CPU 11 is also connected and constructed in such a way as to input each control signal and so on from the operation unit 3, and to input vehicle signals, such as a pulse signal showing, for example, the traveling speed of the vehicle which is outputted from a sensor or the like which is not illustrated from outside the vehicle-mounted navigation apparatus.

Next, an operation of the vehicle-mounted navigation apparatus will be explained.

Hereafter, an explanation of an operation of the vehicle-mounted navigation apparatus in accordance with the present invention which is a feature of the vehicle-mounted navigation apparatus will be made, and an explanation of operations which the vehicle-mounted navigation apparatus in accordance with the present invention carries out in the same way that conventional vehicle-mounted navigation apparatuses do, such as a display operation of determining the current position of the vehicle using a navigation function and showing the current position on a map, and a process operation in an operation mode other than the navigation function, will be omitted.

Figure 2:
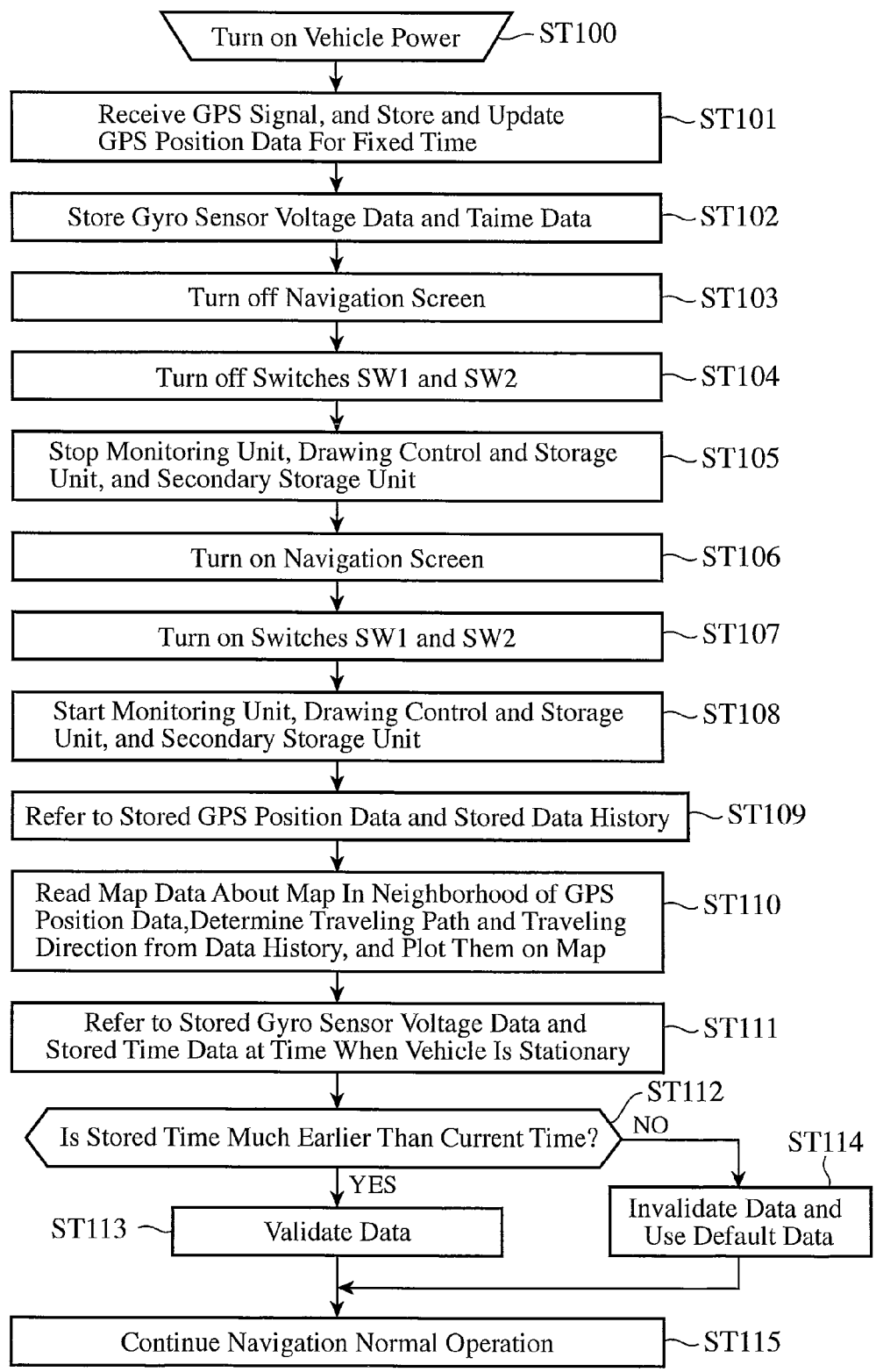
FIG. 2 is a flow chart showing the operation of the vehicle-mounted navigation apparatus in accordance with Embodiment 1.

FIG. 2 is a flow chart showing the operation of the vehicle-mounted navigation apparatus in accordance with Embodiment 1. This figure shows a process of controlling each unit which is performed by the CPU 11 shown in FIG. 1, and mainly shows an operation process which is the feature of the present invention.

In the vehicle-mounted navigation apparatus shown in FIG. 1, when, for example, an accessory power supply of the vehicle in which the apparatus is mounted is brought into its on state (step ST100), power is supplied to the power supply 10 of the navigation system body 1 from an exterior unit not shown in the figure, and predetermined power is supplied from the power supply 10 to each unit which constructs the vehicle-mounted navigation apparatus. The GPS receiver 15 receives electric waves from GPS satellites by using the GPS antenna 4 to generate and output GPS position data to the CPU 11. The CPU 11 stores the GPS position data inputted thereto in the main storage unit 12. At that time, the CPU stores the GPS position data which it collects for a fixed time interval in the main storage unit 12 in turn, and updates the GPS position data which it has stored in turn according to, for example, the storage capacity of the main storage unit 12 (step ST101). Data showing the current time are included in the electric waves from the GPS satellites which the GPS receiver 15 receives, and data showing the time are included in the above-mentioned GPS position data. The CPU 11 recognizes the current time by using the data showing the time from the GPS satellites, and performs each process relevant to time by using this time.

The CPU also stores gyro sensor voltage data showing, for example, an output voltage value of the gyro sensor 16 during a fixed time interval, as well as the GPS position data, in the main storage unit 12, and updates the gyro sensor voltage data which the CPU stores in the main storage unit in turn. Furthermore, when detecting that the vehicle is stationary from the vehicle signal, the CPU 11 associates the gyro sensor voltage data at the time when the vehicle is stationary with the data showing the time to store them in the main storage unit 12 (step ST102).

The operation which is explained above is carried out while, for example, a navigation screen is displayed on the monitoring unit 2, and, when, in the process of step ST100, the power supply of the vehicle, more concretely, the accessory power supply of the vehicle is brought into its on state, both of the switches SW1 and SW2 shown in FIG. 1 are placed in their on state.

When the user manipulates the operation unit 3 in such a way as to turn off the navigation screen displayed on the monitoring unit 2, and a manipulate signal showing the manipulation is inputted to the CPU 11 (step ST103), the CPU 11 controls the switches SW1 and SW2 so as to make them make a transition to their off state (step ST104). When the switch SW1 is turned off, the electric power supply to the secondary storage unit 13 is cut off and the operation of the secondary storage unit 13 is stopped. Furthermore, when the switch SW2 is turned off, the electric power supply to the drawing control and storage unit 14 is cut off, and the image processing operation of the drawing control and storage unit 14 and the image displaying operation of the monitoring unit 2 are stopped (step ST105). Instead of the control operation of bringing the above-mentioned switch SW1 into its off state to stop the operation of the secondary storage unit 13, a control operation of bringing the secondary storage unit 13 into its non-operating state can be carried out. Thus, during a time period during which the vehicle-mounted navigation apparatus does not perform any navigation display, the vehicle-mounted navigation apparatus controls the secondary storage unit 13 to maintain the operation idle state of the secondary storage unit 13, in other words, the vehicle-mounted navigation apparatus stops the supply of the electrical power to the secondary storage unit or brings the secondary storage unit to its non-operating state to reduce the consumption of the secondary storage unit 13.

While not displaying any navigation screen on the monitoring unit 2, the CPU 11 stops the supply of the electrical power to each unit, as mentioned above, and causes the main storage unit 12 to continuously carry out storage and an update of the GPS position data and the gyro sensor voltage data.

When the user manipulates the operation unit 3 so as to turn on the navigation screen display (step ST106), the CPU 11 controls the switches SW1 and SW2 so as to cause each of them to make a transition to its on state (step ST107). The switch SW1 is turned on and the secondary storage unit 13 then starts, and the switch SW2 is turned on and the drawing control and storage unit 14 and the monitoring unit 2 then start (step ST108) The CPU 11 reads some GPS position data stored in the main storage unit 12, e.g., all of the GPS position data stored in the main storage unit 12, refers to a data history which consists of these plural GPS position data (step ST109), and detects the traveling direction of the vehicle by using the position of the vehicle during the time period during which the CPU places the navigation display in the off state, more specifically, during which the CPU places the secondary storage unit 13 in the idle state, more concretely, the position of the vehicle which varies as the vehicle travels, the times included in the GPS position data, and so on.

The CPU 11 uses the newest one of all the GPS position data stored in the main storage unit 12 so as to read map data about an area in a neighborhood of the location shown by the newest GPS position data from the secondary storage unit 13. The CPU also performs a process of determining the traveling path and the traveling direction of the vehicle during the time period during which the CPU places the navigation display in the off state by using the above-mentioned GPS position data history, and plotting a mark showing the determined traveling path and a mark showing the determined traveling direction on a map shown by the above-mentioned map data (step ST110).

Figure 3:
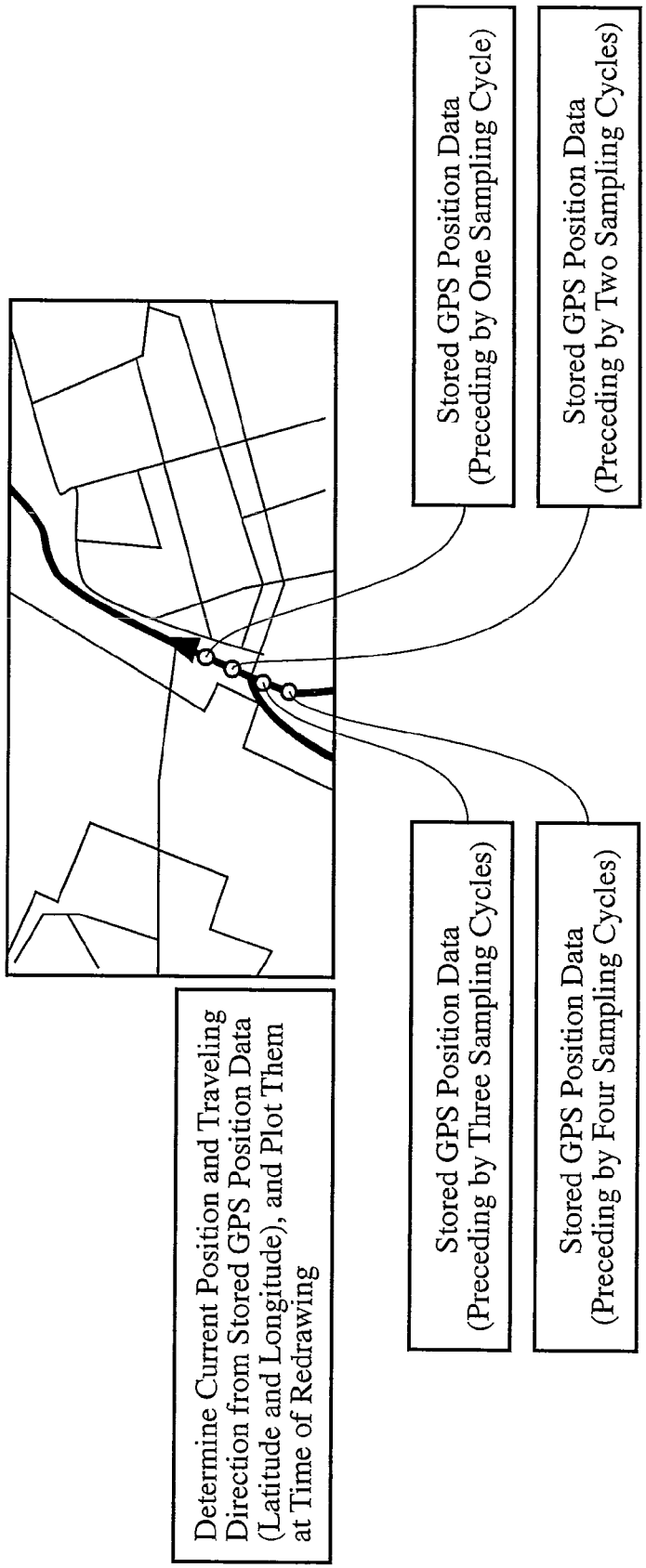
FIG. 3 is an explanatory drawing showing the operation of the vehicle-mounted navigation apparatus in accordance with Embodiment 1.

FIG. 3 is an explanatory drawing showing the operation of the vehicle-mounted navigation apparatus in accordance with Embodiment 1. This figure shows an example of the navigation screen displayed on the monitoring unit 2, and also shows each portion displayed as the navigation screen when the navigation screen is placed in the on state again in the above-mentioned process of step ST106. The vehicle-mounted navigation apparatus determines the current position from data showing the newest position, the data being included in all the GPS position data stored in the main storage unit 12, for example, from data showing the latitude and longitude of the newest position, and, when redrawing the navigation screen, plots a mark showing the current position of the vehicle on the map, more concretely, on a road described in the map, as shown in the screen illustrated in FIG. 3, and also plots a mark showing the traveling direction from the traveling path and the traveling direction which are determined in the process of step ST110. The vehicle-mounted navigation apparatus further plots a mark showing the traveling path at each of positions shown by GPS position data which were stored in the main storage unit 12 at, for example, four different times earlier than that at which the newest GPS position data were stored in the main storage unit 12 by one to four sampling cycles so as to generate image data showing this navigation screen.

Furthermore, when the CPU 11 generates image data about the navigation display at the time of restarting the navigation display by using GPS position data as mentioned above which are stored in the main storage units 12, the CPU 11 corrects the image data by using the gyro sensor voltage data stored in the main storage unit 12 so as to generate the image data in which a correction is made to the display of the current position and the traveling direction of the vehicle. At that time, if there is time data corresponding to the newest gyro sensor voltage data read from the main storage unit 12, more specifically, if the newest gyro sensor voltage data is the one at a time when the vehicle is stationary, the CPU judges whether the time data corresponding to the gyro sensor voltage data, i.e., the stored time is earlier than the current time by a predetermined time interval or more (step ST112). For example, the above-mentioned predetermined time interval is a time interval which elapses between occurrence of a temperature drift in the gyro sensor 16 while the vehicle is stationary and a start of change in the output voltage of the sensor.

When in the process of step ST112, the CPU judges that the time indicated by the time data corresponding to the newest gyro sensor voltage data stored in the main storage unit 12 is not earlier than the current time by the predetermined time interval or more, the CPU validates the gyro sensor voltage data corresponding to the time data (step ST113), and generates image data in which the current position and the traveling direction of the vehicle are corrected by using the validated gyro sensor voltage data. After performing the navigation display by using the image data at the time of restarting the navigation display, which the CPU has generated in this way, the CPU continuously performs a normal operation of the navigation function (step ST115). More specifically, the CPU restarts the navigation display by using the GPS position data and the gyro sensor voltage data at the time when the navigation display is at rest, and, after performing this display operation, detects the current position and the traveling direction of the vehicle by using the GPS position data from the GPS receiver 15, and the output voltage of the gyro sensor 16. The CPU further receives map data corresponding to the current position from the secondary storage unit 13 which the CPU has restarted, and generates data about an image in which a mark showing the current position and the traveling direction of the vehicle and so on are plotted on a map. The CPU also controls the drawing control and storage unit 14 so as to cause the drawing control and storage unit to process the image data, further causes the monitoring unit 2 to display a navigation screen, and continues the navigation display according to the current position and the traveling direction of the vehicle which varies with time.

In a case in which the newest gyro sensor voltage data stored in the main storage unit 12 is the one at the time when the vehicle is traveling, the CPU uses this data to perform the same correction process as that in the normal operation of the navigation function.

When in the process of step ST112, the CPU judges that the time indicated by the time data stored in the main storage unit 12 is considerably earlier than the current time, the CPU invalidates the gyro sensor voltage data which are stored while being brought into correspondence with the time data, carries out the processing by using data which are stored and set up in the main storage unit 12 as default data (step ST114), and makes each unit operate in the same way as previously explained and advances the processing to the process of step ST115 to continuously perform the normal operation of the navigation function.

As mentioned above, when the CPU 11 stops the navigation display according to an operation performed on the operation unit 3, the vehicle-mounted navigation apparatus in accordance with Embodiment 1 causes each of the switches SW1 and SW2 to make a transition to the off state so as to stop the operation or display of the drawing control and storage unit 14 and the monitoring unit 2, and also stops the operation of the secondary storage unit 13 which stores map data, thereby reducing the consumption of the secondary storage unit 13 which consists of a relatively short-life HDD, a relatively short-life DVD driver, and so on by stopping the operation of the secondary storage unit 13. Therefore, the present embodiment offers an advantage of being able to increase the longevity of the actual use of the whole vehicle-mounted navigation apparatus.

Furthermore, the CPU 11 causes the main storage unit 12 to store the GPS position data which are outputted from the GPS receiver 15 during a time period during which the CPU places the navigation display in the off state, and data showing the output voltage of the gyro sensor 16, and, when performing the navigation display the next time, generates image data showing a navigation screen in which a mark showing the traveling path and the traveling direction is plotted by using the GPS position data stored in the main storage unit 12 and the data showing the output voltage of the gyro sensor 16. Therefore, the present embodiment offers an advantage of being able to shorten the time required to start the navigation display the next time.

Furthermore, when the vehicle signal shows that the vehicle is stationary during a time period during which the CPU 11 places the navigation display in the off state, the CPU 11 stores data showing the time, as well as the data showing the output voltage of the gyro sensor 16, in the main storage unit 12, the CPU 11 judges whether the time shown by the time data corresponding to the data showing the output voltage of the gyro sensor 16, which are stored in the main storage unit 12, is earlier than the current time by a predetermined time interval or more when performing the navigation display the next time, and, when judging that the time shown by the time data is earlier than the current time by the predetermined time interval or more, does not use the data showing the output voltage of the gyro sensor 16 for the correction process of correcting the image data for the navigation display. Therefore, the present embodiment offers an advantage of being able to remove the influence of change in the output voltage of the gyro sensor 16 due to a temperature drift, thereby preventing deterioration in the precision of a locator comprised of the GPS receiver 15, the gyro sensor 16, and so on.

Embodiment 2

Figure 4:
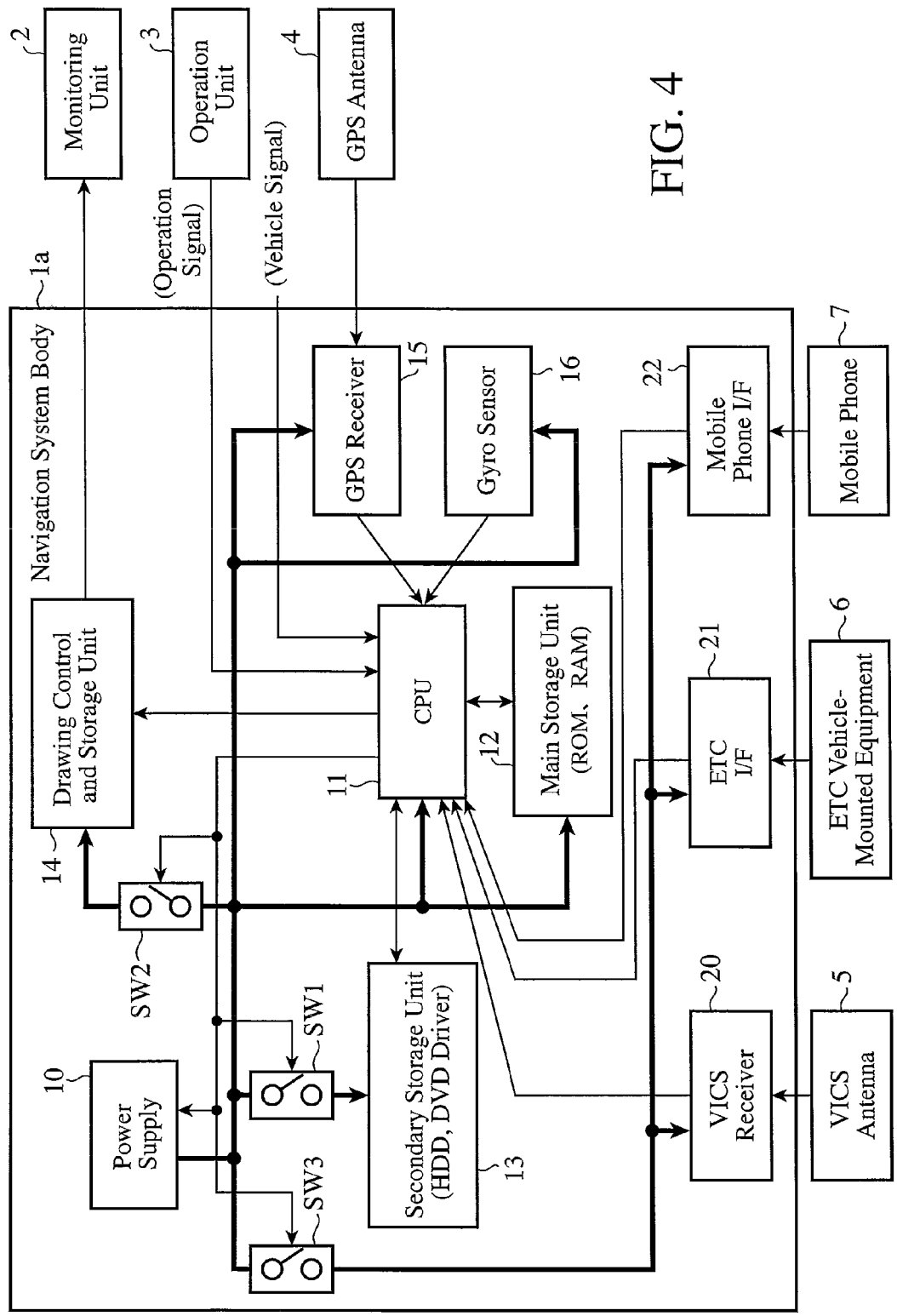
FIG. 4 is a block diagram showing the structure of a vehicle-mounted navigation apparatus in accordance with Embodiment 2 of the present invention.

FIG. 4 is a block diagram showing the structure of a vehicle-mounted navigation apparatus in accordance with Embodiment 2 of the present invention. The same components as those shown in FIG. 1 and like components are designated by the same reference numerals as those used in the figure, and the explanation of the components will be omitted hereafter. A navigation system body 1*a* of the vehicle-mounted navigation apparatus in accordance with Embodiment 2 is connected to a monitoring unit 2, an operation unit 3, and a GPS antenna 4, like the navigation system body 1 shown in FIG. 1, and receives a vehicle signal from outside the vehicle-mounted navigation apparatus. The navigation system body 1*a* is also connected to a Vehicle Information and Communication System (referred to as VICS from here on) antenna 5 which receives road traffic information, an Electronic Toll Collection System (referred to as ETC from here on) on-board unit 6 which automatically makes a payment of a toll fee for a toll road or the like, and a mobile phone 7 which performs a telephone call and data communications by using a wireless communication network.

The navigation system body 1*a* is provided with a power supply 10, a CPU 11, a main storage unit 12, a secondary storage unit 13, a drawing control and storage unit 14, a GPS receiver 15, and a gyro sensor 16, like that explained in Embodiment 1. Furthermore, the navigation system body 1*a* is provided with a VICS receiver 20 for outputting VICS data which the navigation system body obtains by processing a signal received by the above-mentioned VICS antenna 5 to the CPU 11, an ETC interface (interface is referred to as I/F from here on) 21 for outputting ETC data which the navigation system body obtains by processing an output signal of the ETC on-board unit 6 to the CPU 11, and a mobile phone I/F 22 for outputting communications data which the navigation system body obtains by processing an output signal from the mobile phone 7 to the CPU 11.

The VICS receiver 20, the ETC I/F 21, and the mobile phone I/F 22 are connected to the power supply 10 in such a way as to receive the supply of electric power from the power supply 10, and are connected and constructed in such a way that this electric power supply is carried out via a switch SW3 which is switched on and off under the control of the CPU 11.

Next, the operation of the vehicle-mounted navigation apparatus will be explained.

Hereafter, the duplicated explanation of the same operation as that explained in Embodiment 1 will be omitted, and an explanation of an operation of the vehicle-mounted navigation apparatus in accordance with Embodiment 2 which is a feature of Embodiment 2 will be made.

FIG. 5 is a flow chart showing the operation of the vehicle-mounted navigation apparatus in accordance with Embodiment 2. The same processes as those shown in FIG. 2 and like processes are designated by the same reference characters as those used in the figure, and the duplicated explanation of the processes will be omitted hereafter. FIG. 5 shows a process of controlling each unit which is performed by the CPU 11 of the navigation system body 1*a*, and mainly shows an operation process which is a feature of the present invention.

After passing processes of steps ST100 to ST105 in the same way as previously explained, the CPU 11 causes the switch SW3 to make a transition to its off state (step ST201), and stops the power supplied to the VICS receiver 20, the ETC I/F 21, and the mobile phone I/F 22 so as to stop the operation of each of the units (step ST202). When not performing the navigation display, the CPU stops the operation of each of the units which are not required for maintenance of the minimum navigation function in this way.

When the user manipulates the operation unit 3 so as to turn on a display of a navigation screen (step ST106) while the vehicle-mounted navigation apparatus does not perform any navigation display, and the switches SW1 to SW3 are placed in their off state so that the drawing control and storage unit 14, the monitoring unit 2, the secondary storage unit 13, the VICS receiver 20, the ETC I/F 21, and the mobile phone I/F 22 are at rest, processes of steps ST107 to ST112 are performed and processes of steps ST113 and ST114 are performed, and the navigation display is restarted.

The CPU 11 also controls the switch SW3 to bring this switch into its on state when restarting the navigation display (step ST203) so as to start the VICS receiver 20, the ETC I/F 21, and the mobile phone I/F 22 (step ST204). After that, as explained in Embodiment 1, the CPU continuously performs the normal operation at the time of performing the navigation display (step ST115).

The vehicle-mounted navigation apparatus activates the CPU 11, the main storage unit 12, the GPS receiver 15, the gyro sensor 16, and so on in order to perform a minimum operation as the navigation function, and, for example, stops the supply of electric power to the other units, as mentioned above, to stop their operations. By doing in this way, the vehicle-mounted navigation apparatus can restrict the operation of the secondary storage unit 13 to reduce the consumption of the secondary storage unit, and can also reduce the power consumption of the whole vehicle-mounted navigation apparatus when not performing any navigation display.

Because the vehicle-mounted navigation apparatus has only to activate the main storage unit 12, the GPS receiver 15, the gyro sensor 16, and so on, as mentioned above, and process output data from these units when not performing any navigation display, the amount of processing operations performed by the CPU 11 also decreases compared with that of normal operations. Therefore, the CPU 11 can carry out the processing in an operation mode in which the CPU reduces its power consumption, the operation mode being set to a device which is used as the CPU 11. Therefore, the CPU 11 can be made to carry out the control processing after being made to change its operation mode to a low power mode in which its power consumption is lower than normal power consumption when not performing any navigation display. Also in the vehicle-mounted navigation apparatus explained in Embodiment 1, the CPU 11 can be made to operate in an operation mode of low power consumption when not performing any navigation display.

As mentioned above, the vehicle-mounted navigation apparatus in accordance with Embodiment 2 includes the switch SW3 which switches on and off the supply of the electric power to the VICS receiver 20, the ETC I/F 21, and the mobile phone I/F 22 under the control of the CPU 11. Therefore, the present embodiment offers an advantage of being able to stop the supply of electric power to the VICS receiver 20, the ETC I/F 21, and the mobile phone I/F 22, which are used for the navigation function, when not performing any navigation display, thereby being able to reduce the power consumption of the vehicle-mounted navigation apparatus.

The present embodiment offers another advantage of being able to further reduce the power consumption of the vehicle-mounted navigation apparatus because the CPU 11 changes its operation mode to an operation mode of low power consumption to perform its operation process during a time period during which the vehicle-mounted navigation apparatus does not performing any navigation display.

Furthermore, the present embodiment offers a further advantage of being able to reduce the consumption of the secondary storage unit 13 to increase the longevity of the whole vehicle-mounted navigation apparatus, to shorten the time required to display a navigation screen again, and to prevent deterioration in the precision of the locator, like the vehicle-mounted navigation apparatus explained by Embodiment 1.

In a case in which the vehicle-mounted navigation apparatus explained in Embodiments 1 and 2 is constructed in such a way as to include a device having audio functions, such as TV reception and DVD playback, to form a combined audio/navigation apparatus, the vehicle-mounted navigation apparatus can be made to activate its minimum navigation function during a time period during which the vehicle-mounted navigation apparatus performs an operation based on the above-mentioned audio functions without performing any navigation display, as explained in Embodiment 1 or 2. More specifically, while the user uses the audio functions on the basis of an operation which the user has performed on the operation unit 3, the vehicle-mounted navigation apparatus activates the CPU 11, the main storage unit 12, the GPS receiver 15, the gyro sensor 16, and so on among the units which construct the navigation system body 1 or 1a, and controls the other units, especially the secondary storage unit 13 having relatively short life, to stop their operations.

Because a DVD playback operation, a TV receiving operation, and so on are in an exclusive relationship with the navigation display, the vehicle-mounted navigation apparatus does not perform any navigation display while making the audio unit thereof operate according to the user's operation performed on the operation unit 3. Therefore, the vehicle-mounted navigation apparatus can stop the operation of the secondary storage unit 13 to reduce the consumption of the secondary storage unit 13 during a time period during which the user uses the audio functions, and this variant can provide the same operation effects as those provided the apparatus explained in Embodiment 1 or 2.

INDUSTRIAL APPLICABILITY

As mentioned above, the vehicle-mounted navigation apparatus in accordance with the present invention can reduce the operating time of a relatively short-life portion, and can achieve power savings and return to a navigation display promptly. Therefore, the vehicle-mounted navigation apparatus in accordance with the present invention is suitable for use as a navigation apparatus which is mounted in a vehicle, and so on.

The invention claimed is:
1. A vehicle-mounted navigation apparatus including a GPS receiving means for receiving electric waves from GPS satellites, an operation means which is operated by a user, a main memory means for storing control data, a secondary memory means for storing map data, and a control means for generating image data showing a current position of a vehicle by using GPS position data from said GPS receiving means and map data from the secondary storage unit on a basis of an operation performed on said operation means and said control data so as to cause a display means to perform a navigation display, wherein
when controlling said display means according to an operation performed on said operation means not to perform any navigation display, said control means performs a control operation of stopping said secondary memory means, and causes said main memory means to store said GPS position data collected over a certain time period during a time period during which said control means does not perform any navigation display and to store data showing an output voltage of a gyro sensor, and, when performing a navigation display next time according to an operation performed on the operation means, said control means performs a control operation of determining a traveling path and a traveling direction of the vehicle from the GPS position data stored in said main memory means and generating image data for the navigation display and of correcting the image data for the navigation display by using the data showing the output voltage of the gyro sensor stored in said main memory means, wherein the control means inputs a vehicle signal showing a vehicle speed from outside the vehicle-mounted navigation apparatus and, when this vehicle signal shows that the vehicle is stationary, stores the data showing the output voltage of the gyro sensor and data showing a time associated with each other, in the main storage unit, and, when performing the navigation display next time, does not use the data showing the output voltage of the gyro sensor which are stored together with said time data for the correction if the time stored in said main storage is earlier than a current time by a predetermined time interval or more.

2. The vehicle-mounted navigation apparatus according to claim 1, wherein said vehicle-mounted navigation apparatus includes a switching means for switching on and off supply of electrical power to a road traffic information receiving means, an automatic toll fee payment system connecting means for connecting with an automatic toll fee payment system on-board unit, and a mobile phone connecting means for connecting with a mobile phone, and, when not performing any navigation display, the control means causes said switching means to make a transition to an off state, and also makes a transition of its operation mode to an operation mode of low power consumption.

3. The vehicle-mounted navigation apparatus according to claim 1, wherein said vehicle-mounted navigation apparatus includes an audio means having an audio function, and the control means activates said audio means without performing any navigation display.

* * * * *